United States Patent Office 2,870,283
Patented Jan. 20, 1959

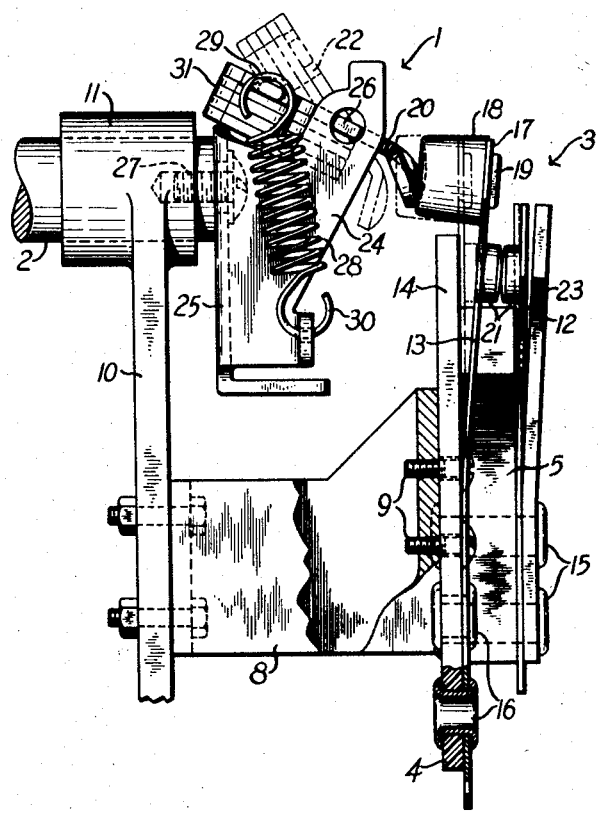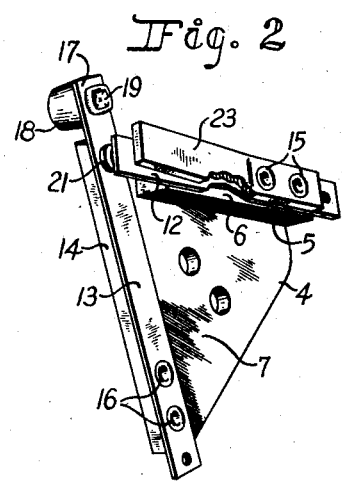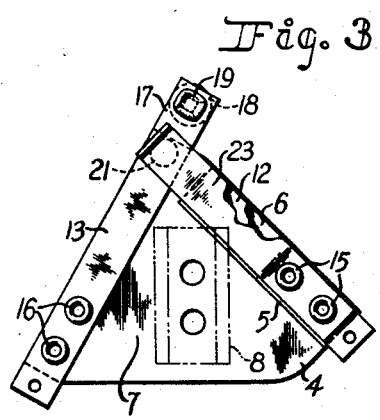

2,870,283

CENTRIFUGALLY ACTUATED SWITCH

William A. Haines, Troy, Ohio, assignor to A. O. Smith Corporation, Milwaukee, Wis., a corporation of New York Application February 21, 1957, Serial No. 641,663

5 Claims. (Cl. 200—80)

This invention relates to a switch actuated by a centrifugal actuator and in particular to a motor starting switch.

Many motors have a starting winding which is connected in circuit until the motor reaches a predetermined speed. To disconnect the winding at such predetermined speed, a switch in the winding circuit is operatively mounted adjacent a centrifugal actuator which is secured to the motor shaft. The actuator is responsive to the speed of the shaft and opens the switch at the predetermined speed.

In accordance with the present invention, the switch comprises a base plate having two parallel surfaces on one side thereof and a pair of angularly disposed leaf springs secured to said surfaces in spaced relation to each other. The springs overlap to provide contact portions which are engaged and disengaged by a rapid moving actuator which engages and bends the inner leaf spring toward the outer leaf spring. The switch base plate is mounted on a support adjacent the actuator to dispose the inner spring in the path of the centrifugal actuator. The leaf springs are mounted on the switch base plate on the opposite sides of the support to substantially dampen leaf spring vibration of the leaf springs.

The present invention provides a simple and rugged switch for use with a rapidly moving switch actuator.

The drawing furnished herewith illustrates the best mode presently contemplated by the inventor for carrying out the invention.

In the drawing:

Figure 1 is a side elevational view of the switch and actuator mounted adjacent a rotatable shaft;

Fig. 2 is a perspective view of the switch; and

Fig. 3 is an end elevational view of the switch of Figure 1.

Referring to the drawing and particularly to Figs. 1 and 2, a centrifugal spring-loaded actuator 1 is rigidly secured to a rotor shaft 2 of a motor, not shown, and actuates a starting switch 3 connected in circuit with a motor starting winding, not shown.

The motor, not shown, includes a starting winding and a running winding which are connected in parallel to an incoming power source until the motor reaches a predetermined speed. At this speed, the actuator 1 snaps to a switch opening position under the action of centrifugal force and opens the switch 3 thereby disconnecting the starting winding from the power source.

The switch 3 includes a triangular base plate 4 with a raised portion or enlargement 5 extending along its one edge. The enlargement 5 establishes a raised surface 6 which lies in a plane which is parallel to the plane of the surface 7 on one side of plate 4. The plate 4 and enlargement 5 are formed of suitable electrically insulating material. The plate 4 is secured to a mounting bracket 8 by mounting bolts 9 which pass through suitable openings in the center of plate 4 and thread into suitably tapped aligned openings in the bracket. The bracket 8 is secured to a bearing frame 10 which supports a bearing 11 for the rotatable shaft 2. The bracket 8 extends from the frame to support the switch 3 in axially spaced relation to the end of the shaft 2 with the surfaces 6 and 7 facing away from the shaft 2.

Outer leaf spring 12 and inner leaf spring 13, of a suitable resilient, electrically conducting material, are aligned respectively one each with the enlargement 5 and with an adjacent edge 14 of the plate 4, with an overlapping contact portion adjacent a common apex of the plate 4. The springs are rigidly secured at their spaced ends one to each of the respective surfaces 6 and 7 by rivets 15 and 16. The inner spring 13 which is secured to edge 14 on the surface 7 of plate 4 extends past the enlargement 5 and beyond the edge of base plate 4 as at 17, and carries a bearing button 18 of nylon or other suitable material. The button 18 is secured to the spring 13 as by flaring a shank 19 which extends through an opening in the spring. Button 18 is engaged by an actuating member 20 of the actuator 1 to bend the inner spring 13 away from the adjacent base plate surface 7 and toward the outer spring 12. A contact button 21 is soldered or otherwise secured to the spring portion of each spring 12 and 13 and the buttons are engaged with each other by the actuating member 20 in the full line position of Figure 1 and are disengaged by the actuating member 20 in the phantom line position as shown by the phantom outline 22 in Figure 1.

In the switch open position, each leaf spring 12 and 13 lies adjacent the respective base surfaces in an unstressed or unloaded position. The enlargement 5 extends forwardly from the attaching rivets 15 and terminates in slightly spaced relation to the contact buttons 21 to provide a shock surface for the spring 12 and also to maintain a predetermined spacing of the contact buttons 21 when the switch 3 is open.

The base plate 4 with the parallel spring support surfaces 6 and 7 provides a uniform tension of the leaf springs without preforming the springs. This provides maximum uniformity of switch force and contact pressure when the contacts 21 are fully engaged.

A rigid backup strip 23 is secured to enlargement 5 in stacked relation to the outer leaf spring 12 by the same rivets 15 which secures leaf spring 12 to enlargement 5 and base plate 4. The strip 23 is bent outwardly in an arc a predetermined distance slightly greater than the arc of the leaf springs when they are bent completely outwardly by the actuating member 20. The backup member 23 serves as a mechanical guard and also limits the vibration of the springs 12 and 13 if the contacts are closed suddenly.

The actuating member 20 of actuator 1 is pivotally secured between a pair of side arms 24 of a channel-shaped bracket 25 on trunnions 26 which extend from the member 20 into bearing openings in the side arms. The bracket 25 is secured to the end of the shaft by a mounting bolt 27 which passes through the base of the bracket 25 and into a correspondingly threaded opening in the end of the shaft 2. The actuating member 20 is normally biased to lie in parallel, spaced relation to the shaft by a pair of coil springs 28 which are disposed generally parallel and outwardly of the side arms. Springs 28 are each secured at one end 29 to the outer portion of the member and at the opposite end 30 to the bracket. The outer portion of the member is weighted by a metal member 31 and as the speed of the shaft increases the centrifugal force increases and eventually just prior to winding cutout speed equals the force of the springs. At the predetermined winding cutout speed, the centrifugal force is greater than the spring force and the member 20 pivots clockwise as seen in Figure 1, and the bearing or button engaging end of the member 20 moves into spaced relation to the button 18 and spring 13. As the member 20 pivots clockwise, the effective arm of the spring force decreases and the member 20 therefore retracts with a snap action.

When the actuating member is thus pivoted, the leaf springs 12 and 13 spring back and strike the base plate 4. The springs strike respectively the enlargement 5 and the base plate 4 along the greater proportion of their length with a resulting snubbing action which dampens the spring vibration normally incident with the quick release of a resilient leaf spring supported only adjacent one end. Further, as the mounting plate 4 is centrally mounted between the leaf springs 12 and 13, there is essentially no tendency for the plate 4 to vibrate upon the actuation of the switch 3 when the shaft reaches switching speed.

Centrifugally operated leaf springs of the described type may also be subject to damage if the shaft 2 is rapidly decelerated and the actuating members 20 rapidly close the switch 3. The actuating member 20 would snap to its full line position and rapidly strikes the button 18 of spring 13 to close the contacts 21 with a hammer-like action. Due to the resiliency of the leaf springs 13 and 12, they would tend to vibrate with an excessive amplitude of vibration. The backup member 23 limits the amplitude of the possible vibration and therefore substantially prevents damage such as harmful fatigue to the leaf springs.

The present invention provides a rugged and simple switch for use with snap action actuators.

Various modes of carrying out the invention are contemplated as being within the scope of the following claims particularly pointing out and distinctly claiming the subject matter which is regarded as the invention.

I claim:

1. A switch mechanism adapted to be mounted adjacent a rapidly moving centrifugal actuating member, which comprises a mounting means adapted to be mounted adjacent the actuating member and having at least two spaced surfaces to one side of the mounting means, said surfaces lying in substantially parallel planes and being electrically insulated from each other, a pair of leaf springs secured one to each of said parallel surfaces and in an unstressed condition lying adjacent the respective surfaces for substantially the entire length of the leaf spring and having an overlapping contact portion adapted to make and break a circuit, and means on the innermost of said leaf springs to be operatively engaged and disengaged by said actuating member.

2. A centrifugally actuated switch adapted to be rapidly opened, which comprises a mounting plate formed of an electrically insulating material, a pair of leaf springs having an overlapped contact portion adapted to make and break a circuit and secured in spaced relation to said overlapped portion to said mounting plate to provide cantilever contact arms, a spacer of electrically insulating material disposed between the plate and the outer of said leaf springs and extended from the connection of the adjacent leaf spring to the plate substantially to the overlapped portion of the leaf springs to hold the outer of said springs in a plane parallel to the inner of said springs, and mounting means on said plate in spaced relation to both of said leaf springs, said construction substantially damping the vibration of the leaf springs upon contact opening movement of the leaf springs.

3. A centrifugally actuated switch, which comprises a base plate of electrically insulating material, a flat leaf spring secured superjacent to said plate and extending past an edge of said plate to provide an actuating overhang, a flat spacing member of electrically insulating material secured to said plate angularly displaced from said leaf spring and terminating immediately adjacent said leaf spring, a second flat leaf spring secured to said spacing member and extending past said spacing member in overlapping relation to said first spring whereby said first spring is adapted to be moved into contact engagement with said second spring to complete a circuit, said spacing member providing a predetermined contact spacing, and a backing strip secured to said spacing member on top of said second leaf spring to restrict movement of said second leaf spring, and said plate being adapted to be mounted adjacent a centrifugal actuator which is adapted to engage said actuating overhang in a non-actuated position and hold the leaf springs bent away from the plate with the second named leaf spring engaging said backing strip.

4. A switch mechanism adapted to be mounted for operation adjacent a snap-action centrifugal actuating member, which comprises a triangular mounting plate of insulating material and having a raised surface extending along one edge of the plate, said raised surface terminating in spaced relation to a second edge of said plate, means disposed centrally of said plates to mount said plate adjacent said actuating member, a first strip leaf spring extending adjacent said plate along said second plate edge and being secured to the plate in spaced relation to the raised surface and extending over the edge adjacent the raised surface and into the path of said actuating member for movement away from the plate, a second leaf spring extending along said raised surface and over said first leaf spring to establish facing electrical contact portions with said first leaf spring and secured adjacent the raised surface in spaced relation to said first leaf spring, and a rigid and arcuate strip secured in superposed relation to said second leaf spring to limit the movement of said leaf springs, said rigid strip having an arc slightly greater than that described by the adjacent leaf spring in a normal contact closed position.

5. A switch mechanism adapted to be mounted for operation adjacent a snap-action centrifugally actuated member which is mounted on a rotatable shaft and rapidly pivoted from a generally axial plane to a perpendicular plane in response to a predetermined speed of rotation of the shaft, which comprises a triangular plate of insulating material having central openings to permit attachment to a switch support with the plate disposed to allow said member to pass over the edge of the plate as it pivots and having a raised parallel surface extending adjacent one edge of the plate, said raised parallel surface terminating in spaced relation to a second edge of the plate, a flat leaf spring lying along said second edge and secured to the plate at an apex opposite said raised surface to allow bending of the leaf spring, said leaf spring extending over said second edge and being disposed in the path of said actuated member, a second flat leaf spring lying along said raised parallel surface and said first edge and secured to said plate at an apex opposite said first leaf spring to allow bending of the second spring, said second spring extending past said raised surface and overlapping said first named spring, and contact buttons secured one to each of the overlapping portions of the spring and alternately engaged and disengaged by the spring movement as said actuated member is alternately in an axial plane and a perpendicular plane with respect to said shaft.

References Cited in the file of this patent

UNITED STATES PATENTS

| | | |
|---|---|---|
| 886,141 | Luschka | Apr. 28, 1908 |
| 1,676,979 | Cheeseman | July 10, 1928 |
| 2,286,848 | Garstang | June 16, 1942 |
| 2,777,912 | Haines | Jan. 15, 1957 |